Aug. 12, 1924.
J. STRAUSS
1,504,392
AUTOMOBILE
Filed March 3, 1920    3 Sheets-Sheet 2
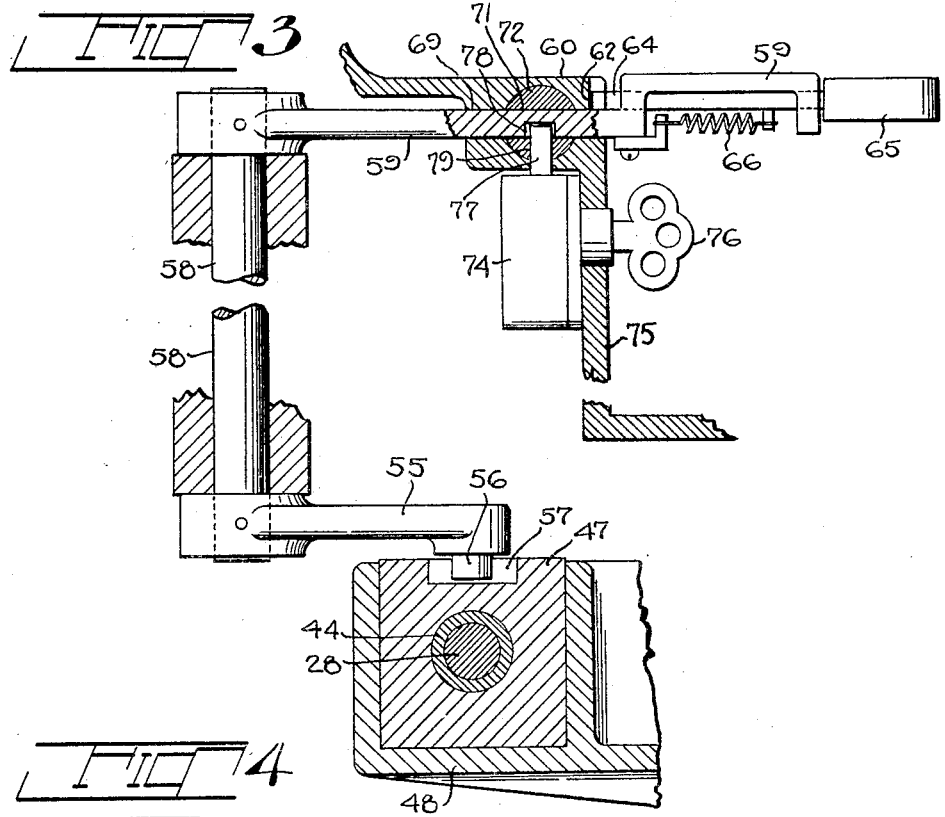
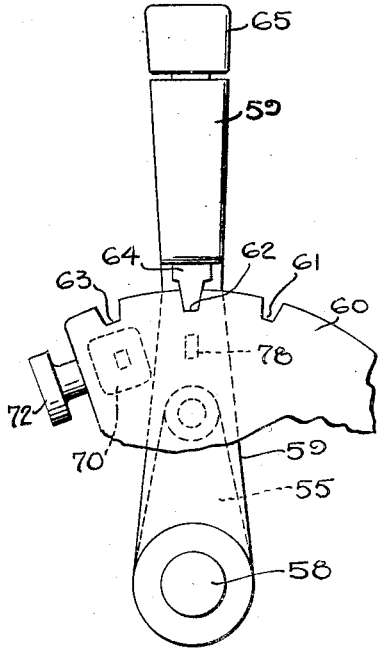
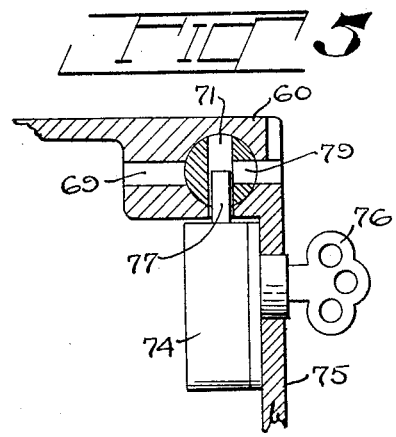

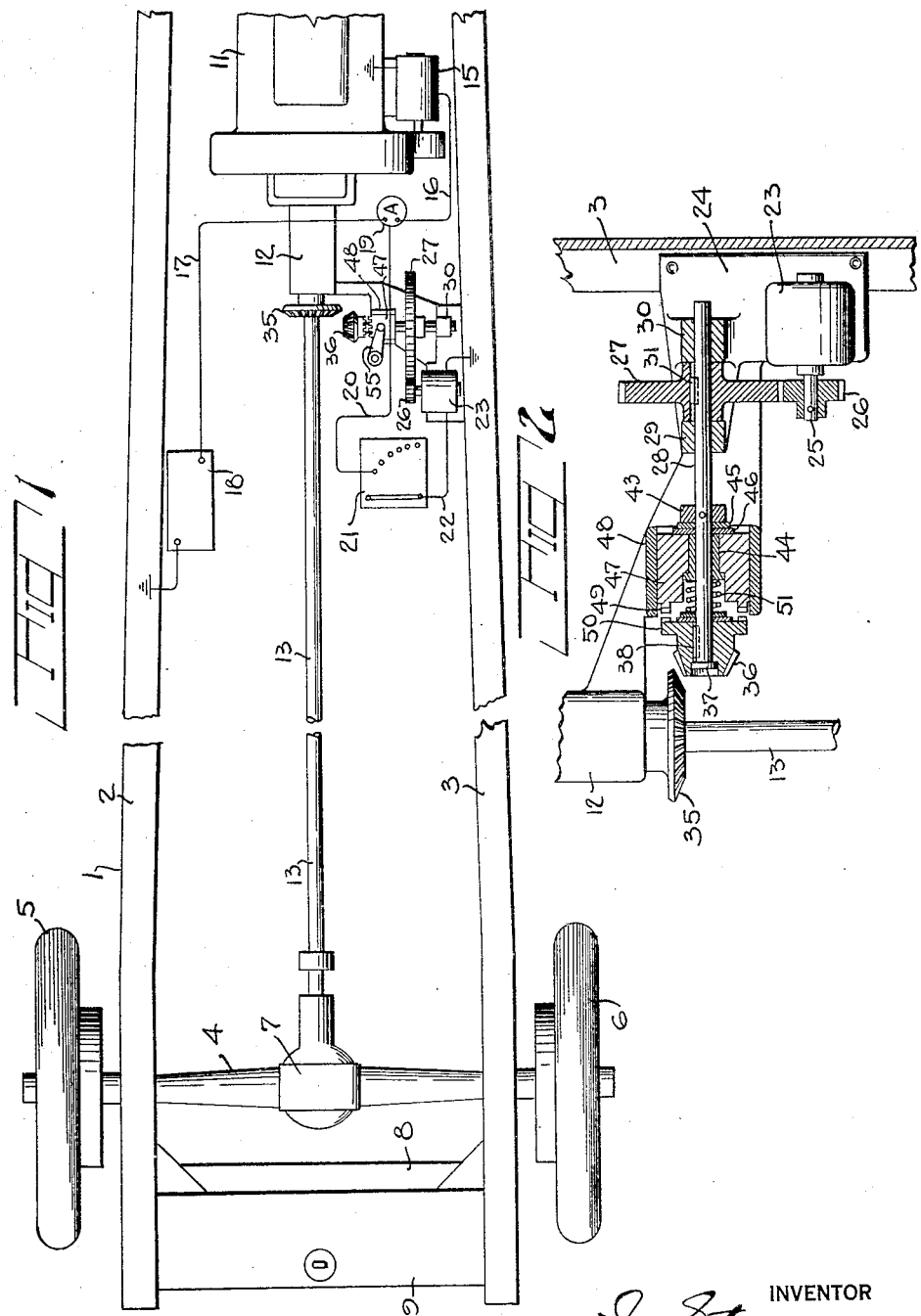

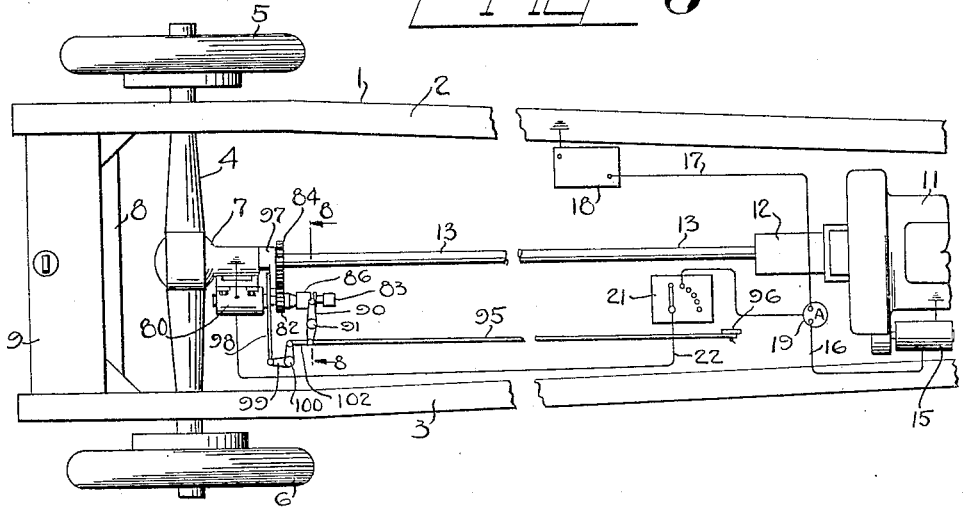

Patented Aug. 12, 1924.

1,504,392

UNITED STATES PATENT OFFICE.

JOSEPH STRAUSS, OF NEW YORK, N. Y., ASSIGNOR TO ABRAHAM KAPLAN, OF NEW YORK, N. Y.

AUTOMOBILE.

Application filed March 3, 1920. Serial No. 362,983.

*To all whom it may concern:*

Be it known that I, JOSEPH STRAUSS, a citizen of the United States, and residing in New York, in the county and State of New York, have invented certain new and useful Improvements in Automobiles, of which the following is a specification.

The invention relates to automobiles, and more particularly to an auxiliary emergency driving mechanism for automobiles.

Objects and advantages of the invention will be set forth in part hereinafter, and in part will be obvious herefrom, or may be learned by practice with the invention; the same being realized and attained by the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan of an automobile chassis embodying the invention;

Fig. 2 is a fragmentary detail plan, on an enlarged scale, with parts in horizontal section, of a part of the mechanism shown in the lower, right hand part of Fig. 1;

Fig. 3 is a fragmentary detail, greatly enlarged, and with parts in section, of the lock for the auxiliary emergency drive;

Fig. 4 is a fragmentary detail, also greatly enlarged, of the locking means for the auxiliary emergency drive;

Fig. 5 is a fragmentary detail, greatly enlarged, of the lock;

Fig. 6 is a top plan of a chassis, generally similar to Fig. 1, but showing a different arrangement of the mechanism of the auxiliary emergency drive;

Fig. 7 is a fragmentary detail, with parts in section, and on a greatly enlarged scale, of the shaft of the motor and associated parts, shown at the left in Fig. 6; and Fig. 8 is a fragmentary detail view, greatly enlarged, and with parts in section, taken on line 8—8 of Fig. 6.

The invention relates to auxiliary emergency means for driving a motor car, and more particularly and as embodied, it comprises motive means for use when the usual motive means for the car fails for any reason, such auxiliary emergency motive means being adapted to store power from the engine during the normal running of the car, and being adapted to apply such stored power between the transmission and the driving wheels to propel the car when the engine or some other part of the ordinary driving means is out of order. Such power is preferably small as compared to the ordinary power plant of a motor car, but is capacitated to run or drive the car at a comparatively slow speed for a distance which is usually sufficient to reach a garage or a repair shop.

The invention as embodied is applied to what is commonly known as a "gas car" that is, a car which is driven by an internal combustion engine, usually fueled with gasolene. Such a car is generally or practically always supplied with an electrical generator and cooperating apparatus or mechanism for producing electrical current for ignition purposes and for "turning over" or starting the engine.

The present embodied form of the invention comprises a secondary or storage battery, which is charged by the engine of the car, and which is adapted to drive a motor which is connected to the rear or driving wheels of the motor car. In accordance with certain features of the invention, the starting or lighting generator or secondary battery, or both, may be employed, although the invention broadly is not so limited. The motor is preferably adapted for a fairly large current at comparatively low voltage, although the invention is not so limited. The motor is usually connected to the rearward of the transmission or gear shifting mechanism, to drive the car when the transmission is in "neutral," that is, with the engine cut off. The relative amount of power required to drive a car under these conditions and at a slow speed is very small.

In connection with the foregoing, means are provided for controlling such mechanism from the usual driver's seat, and in connection therewith means are provided for locking the car in connection with the other mechanism hereinbefore described. Other features of the invention will be pointed out or set forth hereinafter in connection with the detailed description of the present embodiment.

Referring now in detail to the embodiment of the invention, illustrated by way of example in the accompanying drawings, a part of the chassis 1 of a motor car is shown (Fig. 1) including the side frame reaches 2 and 3. The rear axle 4 is shown having wheels 5 and 6, and the differential drive casing is denoted by 7. The rear frame reach is marked 8, and the gas supply tank is marked 9. The engine 11 is preferably an internal-combustion engine, and is in the usual position and the transmission or gear shifting mechanism is in the usual casing 12. The power shaft 13 extends from the transmission mechanism in casing 12 to the differential mechanism in the casing 7. The foregoing parts are shown in a more or less conventional manner, and may be of various forms so far as concerns many features of the invention.

Referring now more particularly to the details of the illustrated embodiment of the present invention as applied to the general structure of a motor car as described, an electric generator, or motor-generator, 15 is mounted on the frame of the engine. So far as concerns many features of the invention, this may be a part of the usual starting and lighting system, or may be used for either starting or lighting, or it may be a separate generator utilized solely for the auxiliary emergency power plant.

In circuit with generator 15 through wires 16 and 17, is a storage or secondary battery 18, adapted to receive and store the electrical energy produced by generator 15 when it is driven by the engine 11. Connected with the circuit of wires 16 and 17, by means of a switch 19 is a wire 20, which passes to a rheostat or starting box 21, which is conveniently located with respect to the driver's seat. From starting box 21 a circuit passes through a wire 22 to a motor 23. The various circuits are shown grounded on the machine frame. Switch 19 is thrown to cause battery 18 to be charged, or to be discharged when driving motor 23.

Motor 23 is supplied with energy from battery 18 and is the driving motor for the auxiliary emergency driving plant for the motor car. In the embodied form of connections and cooperating mechanism, motor 23 is mounted on a supporting base 24 fixed to the frame 3 of the car. On the shaft 25 of the motor is fixed a pinion 26, and meshing with pinion 26 is a gear wheel 27. Gear wheel 27 is splined on a shaft 28, the hub of the gear fitting between journal bearings 29 and 30, in which bearings shaft 28 is journaled and is longitudinally slidable.

Gear wheel 27 is connected to shaft 28 by a spline 31, so that the shaft 28 is rotated by the gear wheel 27, but is longitudinally slidable relatively thereto, the gear wheel being held in place by the bearings 29 and 30.

As embodied, the shaft 28 is made longitudinally slidable to connect and disconnect the motor 23 from the driving shaft 13 of the car. In said embodied form of means, a bevel gear wheel 35 is fixed on power shaft 13, and mounted on shaft 28 is a bevel gear wheel 36, which passes into and out of mesh with gear wheel 35 as shaft 28 is moved to and fro longitudinally.

In the present embodiment also, the locking means cooperates with the means for connecting and disconnecting the auxiliary emergency power from the driving shaft. With this in view, bevel gear wheel 36 is held in position on shaft 28 by a collar 37 and is fixed to rotate with the shaft by a key 38. Fixed on shaft 28 is a collar 43, and encircling the shaft is a sleeve 44, washers 45 and 46 being interposed between the sleeve and the shaft. Sleeve 44 is flanged at its other end, and the sleeve is mounted in a non-rotatable but longitudinally slidable block 47, the block being so slidable in a guideway 48 formed or mounted on the supporting frame.

Block 47 has projecting from its end a ring or crown of teeth 49 and the hub of bevel gear wheel 36 has a corresponding and cooperating ring or crown of teeth 50. These are held out of mesh or engagement with each other in certain positions of the mechanism, but are adapted to pass into mesh or engagement in another position of the mechanism. To effect this action, as embodied, a spring 51 is coiled about shaft 28 within the block 47, the spring being in compression between block 47 and the hub of gear wheel 36. Washers 52 and 53 may be supplied as a bearing for spring 51.

Manually operated means are provided for sliding the block 47 to and fro, both to connect and disconnect motor 23 and shaft 13 and to lock the car. In Fig. 2, the mechanism is shown in the disconnected position. If block 47 is pressed to the left in Fig. 2, shaft 28 will be slid longitudinally therewith and gear wheel 36 will mesh with gear wheel 35, and motor 23 will then drive the car through power shaft 13. In this position the teeth 49 and 50 are not in mesh, due to the pressure of spring 51, and the shafts 28 and 13 are free to rotate and thus to drive the car from motor 23. If block 47 is slid farther to the left in Fig. 2, spring 51 will compress, and teeth 49 on block 47 will engage with teeth 50 on gear wheel 36. As block 47 is non-rotatable and as teeth 49 and 50 are in mesh, and as bevel gears 36 and 35 are in mesh, the entire mechanism is locked, due to the nonrotatability of block 47, and wheels 5 and 6 are locked against rotation. It is understood that switch 19 and starting box lever 21 will be operated to properly control motor 23 for the driving and non-driving positions.

Means are provided for effecting and controlling the movements of block 47, as described, and for locking the block in the wheel locking position for the car. As embodied an arm 55 has a pin 56 projecting into a recess 57 in block 47 (Fig. 3) to slide block 47 to and fro in its bearing 48 for the purposes already described. Arm 55 is fixed on a shaft 58, which is journaled in the frame of the machine. Fixed to arm 58 is a lever 59, with which cooperates a toothed sector, having three notches 61, 62 and 63. Lever 59 is provided with a detent 64, mounted on a sliding hand piece 65, operated by a spring 66. When the detent 64 is in notch 61, the motor 23 and gear wheel 36 are disconnected as shown in Fig. 2. When detent 64 is in notch 62, the gear wheels 36 and 35 are in mesh and motor 23 is driving wheels 5 and 6 through shaft 13, and thereby driving the car. When detent 64 is in notch 63, teeth 49 and 50 are interlocked, gears 36 and 35 are in mesh, and wheels 5 and 6 are locked against rotation. It will be understood that motor 23 will be controlled in conformity with the operation of lever 59 by the switch lever of the starting box 21.

Means are provided for preventing and permitting lever 59 passing into the locking position 63, and also for locking it in that position when desired. As embodied, lever 59 works in a slot 69 in the sector 60. Mounted in the frame of 60 is a rotatable cylinder 70, having therein a slot 71, which passes into and out of alinement with the slot 69 as cylinder 70 is rotated from one position to another. Cylinder 70 is provided with a knob 72 whereby it can be rotated. When cylinder 70 is in the position of Figs. 4 and 5, lever 59 is movable between the engaging and disengaging positions of the gears 36 and 35, but (as shown in Figs. 4 and 5) is prevented from passing into the locking position because slot 71 is out of registry with slot 69. By means of knob 72, cylinder 70 may be given a quarter turn, bringing slots 71 and 69 into registry, and then lever 59 may be moved into notch 63, effecting the locking of the rear wheels 5 and 6 of the car, as already described.

Means are provided for locking lever 59 in the locking position for the car, that is in notch 63. As embodied, a lock 74 is mounted within a closed casing 75 formed in the machine frame, and has a key 76. The bolt 77 of the lock is adapted to pass through an opening 79 in cylinder 70 and to project into a recess 78 formed in the lever 59 (Figs. 3 and 4) thereby locking lever 59 in notch 63, which is the locked position for the car. Lock 74 also serves to lock cylinder 70 against rotation (Fig. 5), as the bolt 77 may be thrown into slot 71 when in the position of Fig. 5, thus preventing the rotation of cylinder 70 by the turning of knob 72. This locks lever 59 out of the locking position while leaving it free to move between the engaging and disengaging positions for the drive from motor 23. This serves as a safety device to prevent unintentional locking of the car when motor 23 is running.

In Figs. 6 to 8 a somewhat different arrangement of mechanism is shown, but it will be understood that both the illustrated arrangements are explanatory and not restrictive of the invention. In Figs. 6 to 8, a motor 80, corresponding to motor 23, is mounted upon or near to the differential casing 7. On the shaft 81 of motor 80 is loosely mounted a pinion 82, the shaft 81 being journaled at 83 in a bearing in the machine frame. Pinion 82 meshes with a gear wheel 84 fixed on the drive shaft 13. A friction drive clutch is arranged between shaft 81 and pinion 82. In the embodied form thereof, the hub of pinion 82 is beveled at 85, and mounted on shaft 81 is a sleeve clutch 86, slidable along shaft 81, but connected to rotate with the shaft by a spline 87. Sleeve 86 is conically hollowed at 88 to fit the bevel 85 on the hub of pinion 82.

The means for actuating the clutch 86 comprises a lever 90, which is yoked at 91 to straddle the sleeve 86 and has pins 92 and 93, which project into an annular groove 94 formed in sleeve 86, to move the sleeve along the shaft to clutching and unclutching positions. Lever 90 is pivoted on a supporting bracket at 91, and to the other end of the lever is pivoted a rod 95, which rod extends forwardly along the chassis and is pivoted to a hand lever 96. Lever 96 corresponds to lever 59, and is located adjacent to the driver's seat.

The embodied form of locking means comprises an arm 97, pivoted loosely on shaft 13. A rod 98 is pivoted to arm 97 and is also pivoted to one arm of a bell crank lever 99. Lever 99 is pivoted on a supporting bracket at 100, and the other arm 101 of lever 99 is pivotally connected to a rod 102. Rod 102 at its other end is pivoted to an arm 103 fixed on the hub 104 of lever 90. Loosely mounted on a stub shaft 105 on arm 97 is a pinion 106, which is in mesh with gear wheel 84. Arm 97 may be swung to bring pinion 106 into mesh with pinion 82, and as both pinions 106 and 82 are in mesh with gear wheel 84, and are brought by arm 97 into mesh with each other, they are thus all locked against rotation.

Thus when lever 96 is in central position, clutch 85, 86 is open. When lever 96 is moved forward (toward the left in Fig. 6) clutch 85, 88 is thrown in and pinion 82 drives shaft 13 by means of gear wheel 84. When lever 96 is moved to the extreme backward position (to the extreme right in Fig. 6) clutch 85, 88 is thrown out, and gear wheel 84 and pinions 106 and 82 are all three in mesh with each other, and the mechanism is thereby locked. This locks wheels 5 and 6, thereby locking the car.

Lever 96 may correspond in structure to lever 59 and the same locking structure and mechanism may be employed and the description and illustration thereof need not be duplicated at this point.

The invention in its broader aspects is not limited to the specific mechanisms shown and described but departures may be made therefrom within the scope of the accompanying claims without departing from the principles of the invention and without sacrificing its chief advantages.

What I claim is:—

1. In an automobile in combination with the arrangement of motor, clutch, transmission, transmission shaft and differential to the rear axle, a motor, means for selectively connecting said motor to said transmission shaft to drive the same, or locking said shaft from rotation.

2. In an automobile in combination with the usual arrangement of motor, clutch, transmission, transmission shaft and differential, a gear on said transmission shaft, a motor, a shiftable gear driven by said motor, means for shifting said gear into mesh with said first gear, and means automatically operable on a predetermined movement of said shifting means for locking said transmission shaft from movement.

In testimony whereof, I have signed my name to this specification.

JOSEPH STRAUSS.